US008490873B2

(12) United States Patent
Behbehani

(10) Patent No.: US 8,490,873 B2
(45) Date of Patent: Jul. 23, 2013

(54) VENDING MACHINE FOR SELECTED BLENDS OF PERFUMES

(76) Inventor: Fawzi Behbehani, Abdula Mubarak (KW)

( * ) Notice: Subject to any disclaimer, the term of this patent is extended or adjusted under 35 U.S.C. 154(b) by 233 days.

(21) Appl. No.: 13/072,936

(22) Filed: Mar. 28, 2011

(65) Prior Publication Data

US 2012/0247613 A1 Oct. 4, 2012

(51) Int. Cl.
*G06F 7/08* (2006.01)
*B67D 7/74* (2010.01)
*G07F 13/06* (2006.01)

(52) U.S. Cl.
USPC .................... 235/381; 222/145.1; 222/145.5; 222/145.6; 222/132

(58) Field of Classification Search
USPC ............... 235/381; 141/98; 222/145.1, 145.5, 222/145.6, 132
See application file for complete search history.

(56) References Cited

U.S. PATENT DOCUMENTS

| | | | | |
|---|---|---|---|---|
| 3,297,061 | A | 1/1967 | Nimee | |
| 4,011,967 | A | 3/1977 | Halsey et al. | |
| 4,527,713 | A * | 7/1985 | Ingram | 222/2 |
| 4,911,212 | A * | 3/1990 | Burton | 141/369 |
| 5,724,256 | A * | 3/1998 | Lee et al. | 700/285 |
| 5,893,487 | A | 4/1999 | Little | |
| 6,003,727 | A * | 12/1999 | Marshall | 222/2 |
| 6,390,453 | B1 * | 5/2002 | Frederickson et al. | 261/26 |
| 7,066,215 | B1 | 6/2006 | Hewlitt et al. | |
| 7,111,652 | B2 * | 9/2006 | Koide et al. | 141/104 |
| 7,152,758 | B2 * | 12/2006 | Fazzio et al. | 222/145.1 |
| 7,512,415 | B2 * | 3/2009 | Fazzio et al. | 455/556.1 |
| 7,543,761 | B2 * | 6/2009 | Mehus et al. | 239/10 |
| 7,883,264 | B1 * | 2/2011 | Liva | 366/177.1 |
| 2002/0047020 | A1 * | 4/2002 | Dudek | 221/9 |
| 2003/0014324 | A1 * | 1/2003 | Donovan et al. | 705/26 |
| 2003/0228999 | A1 * | 12/2003 | Donovan et al. | 512/1 |
| 2005/0228538 | A1 * | 10/2005 | Limburger | 700/239 |
| 2007/0138326 | A1 * | 6/2007 | Hu | 239/690 |
| 2007/0228063 | A1 * | 10/2007 | Walker et al. | 221/1 |
| 2012/0018528 | A1 * | 1/2012 | Samain | 239/6 |
| 2012/0279990 | A1 * | 11/2012 | Werner et al. | 222/132 |

FOREIGN PATENT DOCUMENTS

| | | | | |
|---|---|---|---|---|
| EP | 2260904 | A1 | * | 12/2010 |
| GB | 2398289 | A | * | 8/2004 |
| GB | 2433735 | A | * | 7/2007 |
| GB | 2462274 | A | * | 2/2010 |
| WO | WO 0205200 | A2 | * | 1/2002 |

* cited by examiner

*Primary Examiner* — Michael G Lee
*Assistant Examiner* — Suezu Ellis
(74) *Attorney, Agent, or Firm* — Lowe Hauptman Ham & Berner, LLP

(57) ABSTRACT

A vending machine for dispensing a selected blend of perfumes in response to the deposit of a pre-selected sum of money includes a plurality of containers and a plurality of distinctive scents with one of the scents disposed in each of the containers. A mechanism for selecting one or more of the scents and an amount of one or more of the scents is provided. Further, the vending machine includes a mechanism for blending the selected scents in the selected percentages and providing a sample to a perspective customer. Further, the mechanism includes a slot receiving payment for a quantity of the selected blend together with a delivery process for providing a bottle of the selected perfume to the customer.

4 Claims, 7 Drawing Sheets

| A | B | C | D | E | F | G | I | J | L |
|---|---|---|---|---|---|---|---|---|---|
| 0 | 0 | 0 | 0 | 0 | 0 | 0 | 0 | 0 | 0 |
| 1/4 | 1/4 | 1/4 | 1/4 | 1/4 | 1/4 | 1/4 | 1/4 | 1/4 | 1/4 |
| 1/2 | 1/2 | 1/2 | 1/2 | 1/2 | 1/2 | 1/2 | 1/2 | 1/2 | 1/2 |
| 3/4 | 3/4 | 3/4 | 3/4 | 3/4 | 3/4 | 3/4 | 3/4 | 3/4 | 3/4 |
| Full | Full | Full | Full | Full | Full | Full | Full | Full | Full |

VENDING MACHINE FOR SELECTED BLENDS OF PERFUMES

FIELD OF THE INVENTION

This invention relates to a vending machine for dispensing a selected blend of perfumes in response to the deposit of a pre-selected sum of money and more particularly to a vending machine for dispensing a selected blend of perfume after providing a sample of the perfume.

BACKGROUND FOR THE INVENTION

Vending machines for dispensing a choice of drinks, as for example, various types of coffee, hot chocolate or the like and milkshakes of various flavors are well known and have been in use for many years. For example, a U.S. patent of Nimee, U.S. Pat. No. 3,297,061 discloses an automatic vending machine for comestibles such as milkshakes or soft ice cream. As disclosed, an automatic vending machine will dispense upon selection any of a plurality of flavors of a refrigerated milkshake or soft ice cream in a predetermined controlled quantity.

A device for control of ingredients dispensed in a cup beverage vendor is disclosed in a U.S. patent of Halsey et al., U.S. Pat. No. 4,011,967. As disclosed therein, an electronically controlled ingredient dispensing system in hot or cold vending machines uses a voltage ramp generator and a volume controller for correlating a quantity of dispensed ingredients with the voltage ramp output. Circuit elements are provided to latch-in circuits corresponding to each ingredient after a coin triggered relay switch and beverage selection switches are actuated. A voltage comparator circuit functions to compare a timing circuit voltage of increasing magnitude with a manually variable reference voltage (indicative of ingredient quantity) and activates an ingredient dispensing mechanism when the compared voltage reaches a pre-selected value and deactivates the dispensing mechanism when the voltage reaches a pre-selected higher value. Further circuit elements are provided to increase the quantity of dispensed ingredients upon activation of an extra ingredient selection switch.

A further approach to a liquid dispensing system is disclosed in a U.S. Pat. No. 5,893,487 of Little. The Little patent discloses a fluid dispensing system comprising a tank for the fluid, and means for extracting a quantity of fluid from the tank and for directing the extracted fluid to one or more selected receptacles. The means comprises a fluid collecting device including a vessel having a restricted entry aperture, the vessel being for rotary passage through the tank. An outlet pipe is positioned exteriorly of the tank whereby, in use with fluid in the tank, during a rotary cycle of the vessel air exhausts from the vessel through the outlet pipe as fluid ingresses into the vessel through the aperture during a filling operation, and air flows into the vessel through the aperture as fluid is dispensed through the outlet pipe in a dispensing operation. The term "fluid" as used in the '487 patent includes perfumes.

Finally, a U.S. patent of Hewlitt et al., U.S. Pat. No. 7,066,215 discloses a method for product mixing when one or more concentrates and/or diluents are mixed together in a mixing chamber and the product is dispensed from the machine into a storage container. A machine is also provided for the mixing of one or more concentrates, wherein the machine comprises one or more diluent sources and one or more concentrate sources, the diluent and concentrate sources being in fluid communication with one or more mixing chambers. Further, a process is provided for the simultaneous multiple mixing and dispensing of a plurality of products employing a machine comprising one or more diluent sources and one or more concentrate sources. The diluent and concentrate sources are in fluid communication with a plurality of mixing chambers.

Notwithstanding the above, it is presently believed that there is a need and a potential commercial market for an improved vending machine for selecting blends of perfumes in accordance with the present invention. There should be a market for such machines because the machines allow a customer to select a custom mix of perfumes and receive a sample of the selected perfume before producing the selected blend. Such machines provide a mix of up to ten scents and an ability to mix selected percentages of or amounts of each selected scent. It is also believed that such machines can be manufactured at a competitive cost, will be easy to service and will lead to an increase in sales of the perfumes.

BRIEF SUMMARY OF THE INVENTION

A vending machine for dispensing a selected blend of perfumes in response to the deposit of a pre-selected sum of money comprises and/or consists of a plurality of containers stored in the machine and a plurality of distinctive scents with one of the distinctive scents disposed in each of the containers. The vending machine also includes means for selecting one or more distinctive scents and means are provided for selecting a percentage or an amount of each of the selected scents. In addition, means for blending a minimal amount of each of the selected scents in the selected percentages to provide a sample blend. Means are also provided for sampling the blend and means for depositing a pre-selected payment for receiving a quantity of the selected blend. Finally, means are provided for delivering the quantity of the selected blend to the customer.

In a preferred embodiment of the invention, the number of distinctive scents is ten and the selection of amounts includes 25, 50, 75 or 100% of a selected scent.

The invention will now be described in connection with the accompanying drawings wherein like reference numerals have been used to indicate like parts.

DESCRIPTION OF THE PREFERRED EMBODIMENTS OF THE INVENTION

Figure 1:
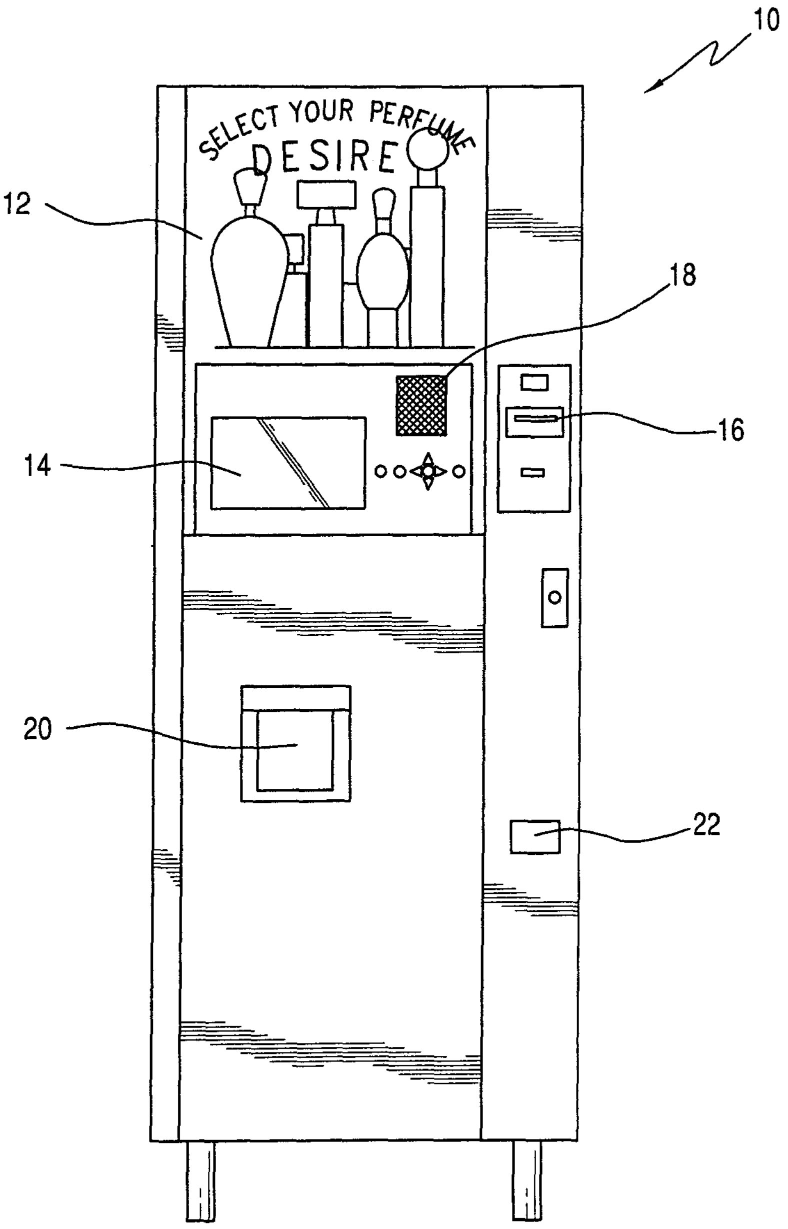
FIG. 1 is a front view of a vending machine in accordance with one embodiment of the invention.

A vending machine 10 in accordance with a first embodiment of the invention is similar to a conventional vending machine and includes an area 12 in an upper front portion thereof for advertising material or the like. For example, such information may include a written description of each of the scents available from the machine. The front surface of the machine also contains an LCD monitor 14 and a money receiving slot 16 or other conventional means for depositing currency as for example bills and coins as indicated on the LCD monitor. For example, different scents and different quantities may have different costs and the cost of a selected blend of scents may vary so that the cost may be shown on the monitor and paid by the customer. As shown, the front of the machine also includes a plurality of closely spaced small openings 18 for providing a sample of the selected perfume as will be described hereinafter with respect to FIG. 7. It is also contemplated that in place of the spaced openings, a spray may be provided to spray a small sample of a selected blend onto an individual's hand or wrists so that the customer can tell what the selected scent smells like on their own hand or wrists.

It is also contemplated that the vending machine 10 may require a modest price for trying one or more blends of various scents.

As shown in FIG. 1 the vending machine 10 may also include a product dispenser 20 and money or change dispenser 22.

Figures 2, 3:
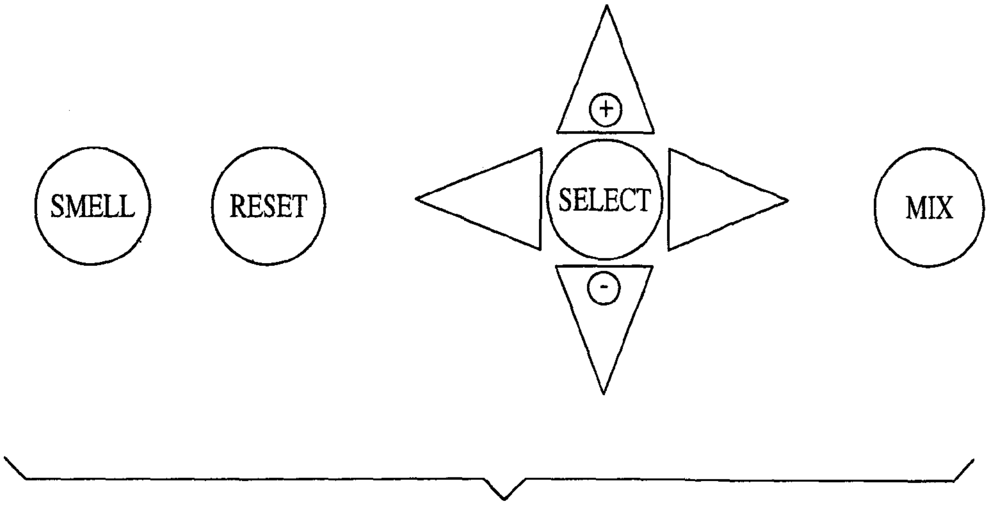
FIG. 2 is a schematic illustration of a front panel to select various amounts of various scents.
FIG. 3 is a schematic illustration of a selection choice as offered by the present invention.

The monitor 14 may also display a selected table 24 as for example shown in FIG. 2. As shown, an offer of up to ten distinctive scents may be identified and described in the area 12. The customer may in a first embodiment of the invention select up to four distinctive scents or possibly more with a more detailed breakdown such as 20, 40, 60, 80 or 100% of a selection of up to five scents.

As illustrated in FIG. 3, a customer selects the scents and their percentages by pressing the arrow button and after completing the selected percentages of selected scents, plus percentages of such scents, presses the smell button to sample the aroma. Then if satisfied, the customer deposits the payment and presses the mix button and collects a bottle of perfume.

Figure 4:
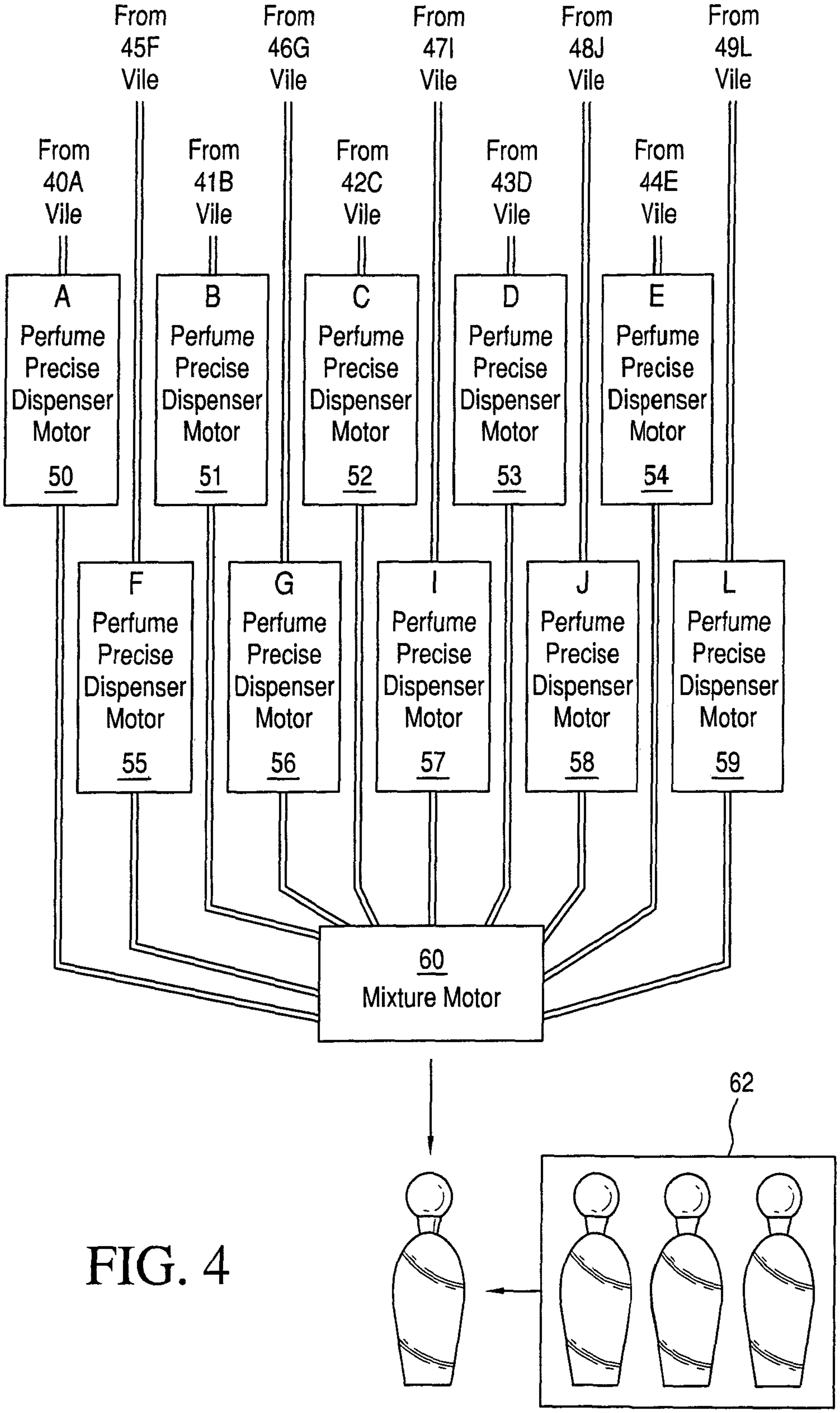
FIG. 4 is a schematic illustration of a series of scents offered by and dispensed in accordance with the present invention.

FIG. 4 shows the location and selecting process as well as a schematic illustration of the storage of distinct scents 40, 41, 42, 43, 44, 45, 46, 47, 48 and 49. A precise dispenser motor and mixers 50, 51, 52, 53, 54, 55, 56, 57, 58 and 59 and mixing motor 60 then supply a perfume by filling a bottle 62.

Figure 5:
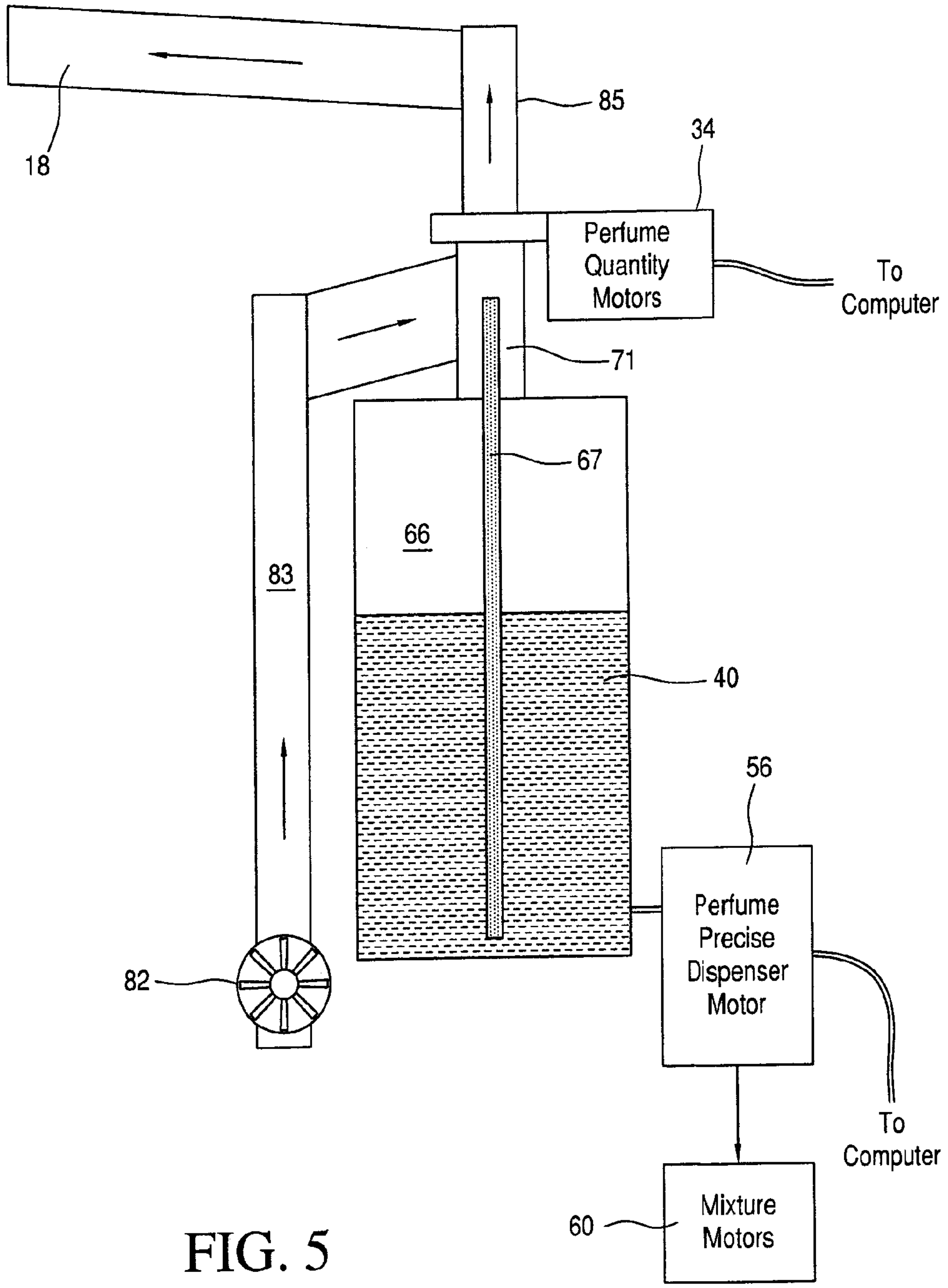
FIG. 5 is a schematic illustration of a sample dispenser.

Referring now to FIGS. 5, 6 *a-e*, and 7, a container 66 containing a distinct scent 40. Also included is an elongated sponge 63 that supplies the odor of a distinct scent to an evaporation chamber 71. A fan 82 blows fresh air through a conduit or duct 83 to the evaporation chamber and a quantity of the selected scent to a duct 85 and to a port 18 so that the customer can smell the scent. The percentage of each scent is provided by a piston gate 1 that opens and closes a duct 2. The gate is moved by a gear 3 that is rotated by a motor (not shown) to a position and sensing spot as set by a computer (not shown). As illustrated in FIG. 6*a* through FIG. 6*e* the duct assembles different volumes. In FIG. 6*a* for example, the duct 2 is closed while it is open to a 25% position in FIG. 6*b*, 50% in FIG. 6*c*, 75% in FIG. 6*d* and 100% or fully opened as illustrated in FIG. 6*e*.

Figure 6A:
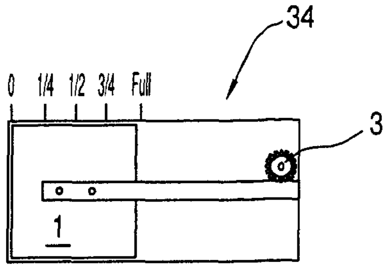
FIG. 6 *a-e* are schematic illustrations of a mechanism for portioning amounts of selected scents in accordance with the present invention.
Figure 6B:
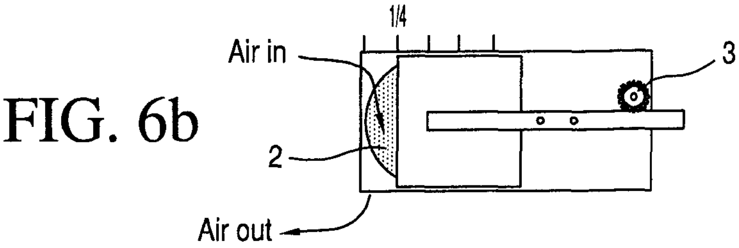
Figure 6C:
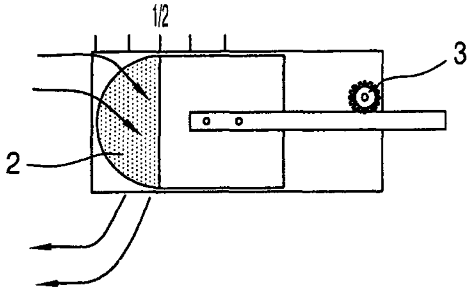
Figure 6D:
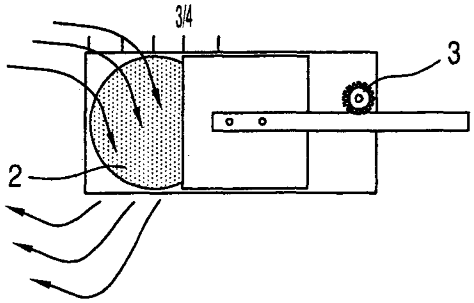
Figure 6E:
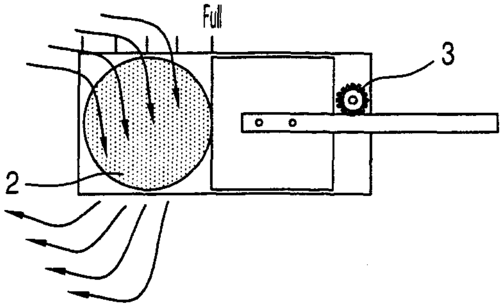
Figure 7:
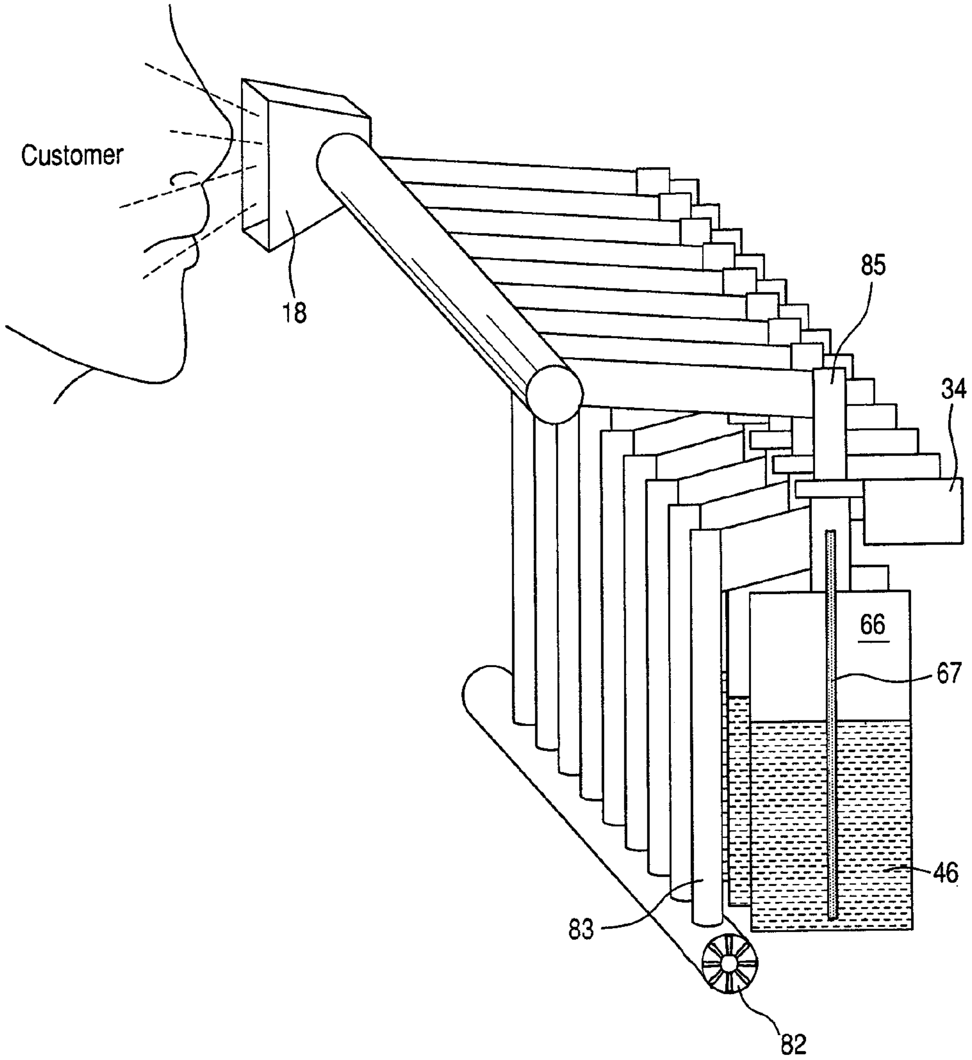
FIG. 7 is a schematic illustration of a sample dispenser in accordance with the present invention.

Referring now to FIGS. 5 and 7 a container 66 containing a distinct scent 40 and also includes an elongated sponge 67 that is evaporated into the evaporation chamber 71. A fan 82 blows air through a duct 83 into the evaporation chamber and a regulator 84 and subsequently into a duct 85 and outwardly to an opening 18 (FIGS. 1 and 5) for a dispenser (not shown). The regulator 84 for each selected scent is opened as shown in FIGS. 6*a*-6*e*, wherein FIG. 6*a* is closed, 6*b* is opened for a 25% mix, FIG. 6*c* for a 50% mix, 6*d* for a 75% mix and 6*e* for a 100% of a selected scent.

Figure 8:
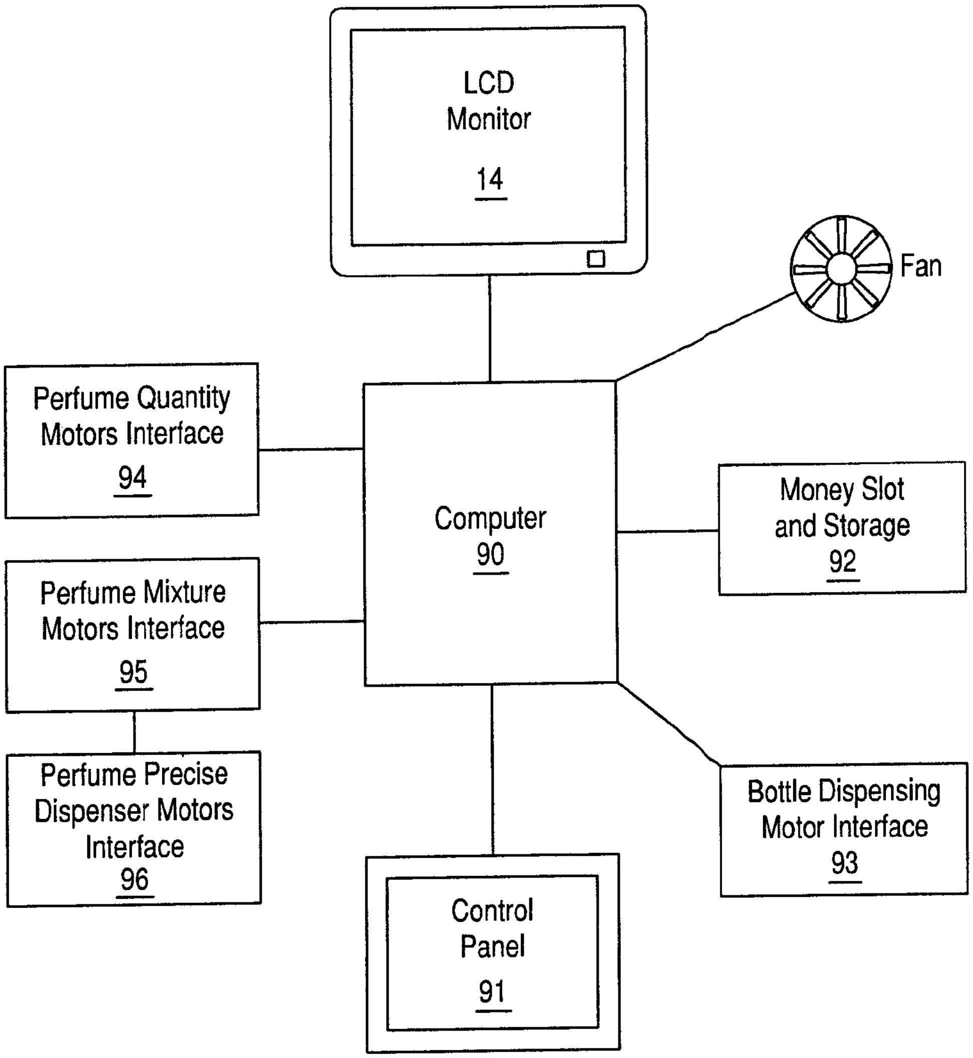
FIG. 8 is a block diagram of computer peripherals and monitors in a preferred embodiment of the invention.

As shown in FIG. 8, the LCD monitor 14 is connected to a computer 90 that enables a customer to formulate a custom perfume from a plurality of distinctive scents. For example, the customer selects the number of scents, which scents to use and selects the percent by volume of each scent to be mixed at control panel 91. The computer 90 is operatively connected to a money slot and storage container 92 wherein the customer submits the purchase price for the selected perfume and orders the machine to deliver a bottle 93 and inject an amount of the selected perfume in the bottle 93. The computer 90 also signals the perfume quantity motor 94 to mix the selected perfumes in the selected amounts in a mixing chamber at interface 95. After dispensing the precise amount 96, and the selected perfume is delivered to the customer as disclosed in connection with FIGS. 4 and 5.

While the invention has been described in connection with its preferred embodiment it should be recognized that changes and modifications may be made therein without departing from the scope of the appended claims.

What is claimed is:

1. A vending machine for dispensing a selected blend of perfumes in response to a deposit of a pre-selected sum of money, said vending machine comprising:

- a plurality of containers and ten distinctive scents with one of said distinctive scents disposed in each of said containers;
- means for selecting one or more of said distinctive scents and means for selecting a percentage amount of each of said selected scents and in which said means for selecting an amount of each of said scents is limited to 0, 25, 50, 75 and 100%;
- an LCD monitor for displaying the selected scents and selected amounts;
- means for blending a minimal amount of each of said selected scents in a selected percentage to provide a sample blend when more than one scent is selected;
- means for sampling the sample blend;
- means for depositing a pre-selected payment for receiving a quantity of the sample blend;
- a plurality of bottles and tops and means for depositing the selected blend of perfumes in a bottle including a top and delivering the bottle with perfume to the customer; and
- a means for charging a different sum of money based on the selection of scents and the amount of selected scents.

2. A vending machine for dispensing a selected blend of perfumes in response to the deposit of a pre-selected amount of money according to claim 1 in which said means for sampling a selected blend includes a means for spraying a minimal amount of said sample blend onto a part of a customer's body.

3. A vending machine for dispensing a selected blend of perfumes in response to the deposit of a pre-selected amount of money according to claim 1 in which said means for sampling a sample blend a means for exposing a sample blend's smell to said customer.

4. A vending machine for dispensing a selected blend of perfumes in response to the deposit of a pre-selected sum of money, said vending machine consisting of:

- ten containers containing ten distinctive scents with one distinct scent disposed in each of said containers;
- means for selecting up to four of said distinctive scents with the volumes of each selected scent varying between 0, 25, 50, 75 and 100%;

an LCD monitor for displaying the selected scents and selected amounts;

means for blending minimal amounts of selected scents in the selected amounts when more than one scent is selected;

means for providing a sample of said selected perfume to a customer;

means for calculating a cost of the selected perfume;

means for depositing a sum of money calculated for the purchase of the selected perfume; and means for delivering a bottle of the selected perfume to a customer;

in which said means for calculating the cost of the selected perfume is based on the selection of scents and the amount of selected scents.

* * * * *